United States Patent [19]

Cody et al.

[11] Patent Number: 5,075,407

[45] Date of Patent: Dec. 24, 1991

[54] FOAMABLE THERMOSETTING POLYURETHANE STRUCTURAL ADHESIVE COMPOSITIONS AND PROCESSES FOR PRODUCING THE SAME

[75] Inventors: Charles A. Cody, Robbinsville; Terrence L. Hartman, New Brunswick, both of N.J.

[73] Assignee: Rheox, Inc., Hightstown, N.J.

[21] Appl. No.: 336,002

[22] Filed: Apr. 10, 1989

[51] Int. Cl.$^5$ .................. C08F 283/04; C08G 18/28; C08G 18/70; C08G 18/10
[52] U.S. Cl. ........................................ 528/71; 521/92; 521/123; 525/453; 528/59
[58] Field of Search ................ 521/92, 123; 525/453; 528/59, 71

[56] References Cited

U.S. PATENT DOCUMENTS

| | | | |
|---|---|---|---|
| 2,577,279 | 12/1951 | Simon et al. | 521/119 |
| 3,505,275 | 4/1970 | Sato et al. | 524/779 |
| 3,595,839 | 7/1971 | Stokes | 528/55 |
| 3,705,132 | 12/1972 | Cuscurida | 525/353 |
| 3,751,392 | 8/1973 | Olstowski | 521/123 |
| 4,018,733 | 4/1977 | Lopez et al. | 524/357 |
| 4,289,860 | 9/1981 | Glander et al. | 525/263 |
| 4,400,497 | 8/1983 | Blum et al. | 528/45 |
| 4,483,974 | 11/1984 | Grogler et al. | 528/68 |
| 4,618,651 | 1/1986 | Gilch et al. | 525/130 |
| 4,690,953 | 9/1987 | Orr et al. | 524/322 |
| 4,720,519 | 1/1988 | Orywol et al. | 524/450 |
| 4,775,719 | 10/1988 | Markevka et al. | 525/125 |
| 4,847,321 | 7/1989 | Hess et al. | 528/61 |
| 4,857,364 | 8/1989 | von Bonin | 427/258 |
| 4,857,623 | 8/1989 | Emmerling et al. | 528/28 |
| 4,927,864 | 5/1990 | Frisch, Jr. et al. | 521/128 |

FOREIGN PATENT DOCUMENTS

| | | |
|---|---|---|
| 202491 | 11/1986 | European Pat. Off. . |
| 260843 | 3/1988 | European Pat. Off. . |
| 300302 | 1/1989 | European Pat. Off. . |
| 2651400 | 5/1978 | Fed. Rep. of Germany . |
| 2-164439 | 6/1990 | Japan . |
| WO90/06332 | 6/1990 | PCT Int'l Appl. . |
| 1104831 | 2/1968 | United Kingdom . |

OTHER PUBLICATIONS

Adhesives Age, Shaping Reactive Hot Melts Using LMW Copolyesters, Hans F. Huber, Nov. 1987, pp. 32–35.

*Primary Examiner*—John Kight, III
*Assistant Examiner*—T. Mosley
*Attorney, Agent, or Firm*—Burns, Doane, Swecker & Mathis

[57] ABSTRACT

The present invention relates to foamable thermosetting polyurethane structural adhesive composites and compositions and processes for producing the same comprising dispersing a water-generating curing composition into a polyurethane base resin to form a nonactivated adhesive composite, and activating the same by heating to form an adhesive composition. Another aspect of the invention relates to dispersing a water-generating compound and an amine-terminated solid polyamide resin into the polyurethane base resin and heat-activating the same to form an adhesive composition.

48 Claims, No Drawings

FOAMABLE THERMOSETTING POLYURETHANE STRUCTURAL ADHESIVE COMPOSITIONS AND PROCESSES FOR PRODUCING THE SAME

FIELD OF THE INVENTION

The present invention relates to thermosetting polyurethane structural adhesive compositions and process for producing the same. The invention also relates to foamable thermosetting polyurethane structural adhesive compositions and processes for producing the same wherein a heat-activated in situ moisture curing mechanism is employed to produce foamable, one-component, heat-activated, thermosetting adhesive compositions.

BACKGROUND OF THE INVENTION

Polyurethane chemistry is currently utilized in producing numerous types of adhesive products. Two-component systems, one-component moisture-cured systems, one-component heat-cured systems and one-component thermoplastic hot melt systems have been used to produce adhesive compositions.

Two-component systems require metering and mixing equipment and heated or non-heated fixturing until substantial curing takes place. The final properties of the adhesive compositions produced by such systems depend on the accuracy of the mix ratio and the efficiency of mixing. U.S. Pat. No. 4,336,298 to Schwarz discloses a two-component polyurethane adhesive system useful for bonding together fiberglass reinforced polyester panels used in the construction of automobiles. The adhesive system comprises a base component containing an aromatic diisocyanate, and a hardener component containing a polyester or polyether triol, paraphenylene diamine or orthophenylene diamine, and preferably, a tin catalyst. The base component and hardener component are mixed together just prior to bonding. The panels to which the adhesive is applied are assembled and held together by clamping until the adhesive sets.

One-component, moisture curable adhesive compositions cure fairly slowly due to dependence on relative humidity and the rate of diffusion of atmospheric moisture into the bondline. Further, fixturing may be required. U.S. Pat. No. 4,511,626 to Schumacher teaches one-component, moisture-curable polyurethane adhesive, sealant and coating compositions useful in bonding articles to substrates. The compositions contain (a) prepolymer(s) derived from 4,4'-diphenylmethane diisocyanate, or isocyanate functional derivative(s) of 4,4'-diphenylmethane diisocyanate, and polyol(s) containing hydroxyl groups, and (b) bis[2-(N,N-dialkylamino)alkyl]ethers. The compositions disclosed by Schumacher require several days for cure-through by atmospheric moisture.

One-component, heat-curable adhesive compositions require sustained heating and possibly fixturing to cure. Heat sensitive substrates cannot be used. U.S. Pat. No. 4,647,646 to Hardy et al. discloses one-component, heat-curable polyurethane adhesive compositions useful for bonding nylon or polyester flock to a primed polychloroprene, SBR or EPDM base layer. The composition is prepared as follows. A urethane prepolymer is prepared by reacting an isocyanate compound and a polyol compound. Two thirds of the isocyanate terminals are then reacted with a ketoxime blocking agent. The remaining one third of the isocyanate terminals are reacted with an amine group of a trifunctional amino compound. Following application, the adhesive is heated and the blocking agent is released and the deblocked isocyanate groups are free to react with available amine groups on neighboring prepolymer molecules resulting in curing and crosslinking. Although Hardy et al. claims lower bake temperatures and shorter cure times than the prior art, sustained heating is required after application of the adhesive composition, and use with heat sensitive substrates may not be possible. However, since flocking adhesives are usually sprayed, brushed or rolled as solutions, very thin layers are employed which require less intense curing conditions.

One-component, thermoplastic hot melt adhesive compositions are non-reactive and therefore have inferior heat resistance after application. U.S. Pat. No. 4,608,418 to Czerwinski et al. discloses processes for forming one-component thermoplastic polyurethane hot melt compositions by blending one or more polyisocyanate compounds with one or more hydroxyl terminated polyols, one or more chain extenders and one or more plasticizers. No chemical curing of the composition occurs after its application. Adhesive properties develop as the material cools and resolidifies.

SUMMARY OF THE INVENTION

The present invention overcomes the problems and disadvantages of the prior art by providing a process for producing a thermosetting polyurethane structural melt adhesive composition wherein a heat-activated in-situ moisture curing mechanism is employed.

The present invention also provides a process for producing a foamable thermosetting polyurethane structural adhesive composition wherein a heat-activated in situ moisture curing mechanism is employed.

It is an object of the invention to provide a foamable thermosetting polyurethane structural adhesive composition that cures quickly.

It is a further object of the invention to provide a foamable thermosetting polyurethane structural adhesive composition that exhibits superior green strength.

It is another object of the invention to provide such an adhesive composition that exhibits superior structural adhesive properties.

It is an additional object of the invention to provide such an adhesive composition that exhibits superior heat resistance.

It is yet an additional object of the invention to provide a foamable thermosetting polyurethane structural adhesive composition that is lighter in weight than prior art hot melt adhesive compositions.

It is a further object of the invention to provide such an adhesive composition that acts as a sound and temperature insulator.

It is also an object of the invention to provide a process for producing a foamable thermosetting polyurethane structural adhesive composition wherein an in situ moisture curing mechanism is employed to produce a one-component, foamable, heat-activated, thermosetting adhesive composition that is useful in bonding applications in the automotive, aerospace, electronics, marine and furniture assembly industries.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for producing a foamable thermosetting polyurethane structural adhesive composition comprising dispersing a water-generating curing composition into a polyurethane base resin at a temperature of from about 25° C. to about 200° C. to form a nonactivated adhesive composite, and heating the same at a temperature of from about 50° C. to about 250° C. to cure the composite and form said adhesive composition.

The invention also provides a process for minimizing or preventing preactivation of the final adhesive composition comprising drying, treating with at least one monoisocyanate compound, or encapsulating the water-generating curing composition in an inert material prior to dispersing the same into the polyurethane base resin.

The invention also provides a polyurethane base resin for use in the above processes which may be moisture cured to form a reactive adhesive composition.

The invention also provides a process for producing a foamable thermosetting polyurethane structural adhesive composition wherein the degree of foaming can be adjusted as desired comprising dispersing a water-generating curing composition and an amine-terminated solid polyamide resin into a polyurethane base resin at a temperature of from about 25° C. to about 200° C. to form a nonactivated adhesive composite, and heating the same to a temperature of from about 50° C. to about 250° C. to cure the composite and form the adhesive composition. By varying the proportions of the water-generating curing composition and the amine-terminated solid polyamide resin, the desired degree of foaming can be achieved. The invention provides an entire range of products with varying physical properties and performance.

The processes of the invention provide one-component, heat-activated, foamable thermosetting polyurethane structural adhesive compositions useful in structural bonding applications in the automotive, aerospace, electronics, marine and furniture assembly industries. The adhesive compositions are lightweight, fast-curing, exhibit superior green strength, superior structural adhesive properties, and superior heat resistance than prior art adhesive compositions and also insulate sound and temperature. The compositions adhere to a wide variety of substrates and thus are useful in numerous applications.

DESCRIPTION OF THE PREFERRED EMBODIMENTS

Reference will now be made in detail to the present preferred embodiments of the invention.

The polyurethane base resins useful in the processes of the invention are those resins that have melting points preferably at least about five degrees lower than the point of water formation or release from the water-generating curing composition employed or the melting point of the amine-terminated solid polyamide resin employed, more preferably from about ten to about twenty degrees lower, most preferably at least forty degrees lower than the point of water formation or release from the water-generating curing composition or the melting point of the amine-terminated solid polyamide resin. The base resin may be in solid, molten or liquid form. The base resin may be milled.

Polyurethane base resins suitable for use in the processes of the invention may be prepared by known processes. A polyurethane base resin may be prepared by reacting a stoichiometric excess of a polyisocyanate compound with at least one polyol compound to form a prepolymer. A stoichiometric excess of the polyisocyanate compound produces isocyanate terminals on the prepolymer chain that can be reacted further with species containing at least two active hydrogen atoms, such as primary and secondary polyamines, water, polyalcohols, polyacids and polymercaptans, resulting in curing.

Exemplary suitable polyisocyanate compounds useful for preparing a polyurethane base resin for use in the present invention include aromatic, aliphatic, cycloaliphatic, and aralkyl polyisocyanate compounds containing from about 6 to about 100 carbon atoms. The term "aliphatic polyisocyanate" as used herein includes any organic polyisocyanate compound in which the isocyanate groups are attached to saturated carbon atoms. Preferably, the polyisocyanate compound employed contains two isocyanate groups, however, polyisocyanate compounds containing greater than two isocyanate groups are suitable for use in preparing the polyurethane resin of the invention providing that the resulting urethane compound is a liquid or thermoplastic solid. A mixture or a blend of more than one polyisocyanate compound may also be employed. The following polyisocyanate compounds are exemplary suitable compounds for use in the invention: 4,4'-diphenylmethane diisocyanate; 2,4'-diphenylmethane diisocyanate; toluene-2,4-diisocyanate; toluene-2,6-diisocyanate; 3-phenyl-2-ethylenediisocyanate; 1,5-naphthalene diisocyanate; 1,8-naphthalene diisocyanate; cumene-2,4-diisocyanate; 4-methyoxy-1,3-phenylene diisocyanate; 4-chloro-1,3-phenylenediisocyanate; 4-bromo-1,3-phenylene diisocyanate; 4-ethyloxy-1,3-phenylenediisocyanate; 2,4'-diisocyanatodiphenyl ether; 5,6-dimethyl-1,3-phenylenediisocyanate; 2,4-dimethyl-1,3-phenylenediisocyanate; 4,4'-diisocyanatodiphenyl ether; benzidinediisocyanate; 4,6-dimethyl-1,3-phenylenediisocyanate; 9,10-anthracenediisocyanate; 4,4'-diisocyanatodibenzyl; 3,3'-dimethyl-4,4'-diisocyanatodiphenylmethane; 2,6-dimethyl-4,4'-diisocyanatodiphenyl; 2,4-diisocyanatostilbene; 3,3'-dimethyl-4,4'-diisocyanatodiphenyl; 3,3'-dimethoxy-4,4'-diisocyanatodiphenyl; 1,4-anthracenediisocyanate; 2,5-fluoroenediisocyanate; 1,3-phenylenediisocyanate; 1,4-phenylenediisocyanate; 2,6-diisocyanatobenzylfuran; bis(2-isocyanatoethyl)fumarate; bis(2-isocyanatoethyl)carbonate; bis(2-isocyanatoethyl)-4-cyclohexene-1,2-dicarboxylate; polymethylene polyphenyl isocyanate; 1,4-tetramethylenediisocyanate; 1,6-hexamethylenediisocyanate; 1,10-decamethylenediisocyanate; 1,3-cyclohexylenediisocyanate; 1,4-cyclohexylenediisocyanate; 4,4'-methylene-bis(cyclohexylisocyanate); m- and p-tetramethylxylene diisocyanate; 2,2,4-trimethyl-1,6-hexamethylene diisocyanate; m- and p-xylylene diisocyanate; 3-isocyanatomethyl-3,5,5-trimethylcyclohexyl isocyanate; phenylene bis(2-ethyl isocyanate); 4-methyl-1,3-cyclohexylene diisocyanate; 2-methyl-1,3-cyclohexylene diisocyanate; 2,4'-methylene bis(cyclohexylisocyanate); lower alkyl esters of 2,5-diisocyanatovaleric acid; and polyisocyanates containing three or more isocyanate groups per molecule such as triphenylmethane triisocyanate and 2,4-bis(4-isocyanatocyclohexylmethyl)cyclohexyl isocyanate.

4,4'-diphenylmethane diisocyanate (MDI) is preferred for preparing a polyurethane base resin for use in the processes of the invention.

Polyols suitable for use in preparing a polyurethane base resin for use in the processes of the invention include polyesters, polyethers, polyamides, polycarbonates, polyesteramides, polythioethers, polyacetals, polyurethanes, polybutadienes or copolymers with acrylonitrile or styrene for example, castor oil and its derivatives and any monomeric polyols such as ethylene glycol, 1,2-propylene glycol, diethylene glycol, triethylene glycol, dipropylene glycol, trimethylene glycol, 1,3- and 1,4-butane diol; hexamethylene glycol, neopentyl glycol, glycerin, trimethylolpropane and pentaerythritol.

Polyester polyols are preferred to provide a suitable balance in the prepolymer rigidity at room temperature and fluidity at moderately elevated temperatures such as from about 50° C. to about 70° C. Polyester polyols having a functionality of two are more preferred since such polyols form essentially linear oligomers when reacted with excess diisocyanate. The linearity of the prepolymer imparts thermoplasticity and stability to the base resin and the final adhesive product. Saturated copolyester diols are most preferred because by using combinations of various types of such diols the final adhesive properties can be adjusted to achieve desired properties. Polyester polyols formed from one or more compounds which possess at least two hydroxyl groups such as polytetramethylene ether glycol, also ethylene glycol, diethylene glycol, triethylene glycol, 1,2-propylene glycol, dipropylene glycol, trimethylene qlycol, 1,3- and 1,4-butanediol, neopentyl glycol, hexamethylene glycol, decamethylene glycol, glycerin, trimethylolpropane, hexanetriol, pentaerythritol, and sorbitol, and one or more compounds which possess at least two carboxyl groups, such as malonic acid, maleic acid, succinic acid, adipic acid, tartaric acid, pimelic acid, sebacic acid, oxalic acid, glutaric acid, suberic acid, azelaic acid, dimerized fatty acids, isophthalic acid, phthalic acid, terephthalic acid, hexahydrophthalic acid, aconitic acid, trimellitic acid and hemimellitic acid can also be used. Ring-opened polymers of cyclic esters such as polycaprolactone can also be used and the so called polymer polyol compositions such as polyether polyols and/or polyester polyols, and also polyols which can be obtained by polymerizing ethylenically unsaturated compounds, such as acrylonitrile, styrene, α-methylstyrene and methylmethacrylate in a polyether or polyester polyol are suitable. Also suitable are 1,2-polybutadiene glycol, 1,4-polybutadiene glycol, polyhydroxy polyacrylate, and epoxy resins and mixtures thereof.

Applicants have invented a polyurethane base resin that is most preferred for use in the present processes for producing thermosetting polyurethane structural adhesive compositions. Moreover, the polyurethane base resin may also be used, without modification, as a reactive adhesive composition that is cured by atmospheric moisture. The polyurethane base resin is prepared by reacting a stoichiometric excess of a polyisocyanate with a combination of three different types of hydroxyl-terminated, linear, saturated copolyesters each having a molecular weight between 1000 and 6000 g/mol.

The first type (Type 1) of hydroxyl-terminated, linear, saturated copolyesters used to produce the polyurethane base resin of the invention is solid, amorphous copolyesters having glass transition temperatures above 0° C. and at least from about 80% to about 100% aromatic character. These copolyesters impart increased hardness and decreased elasticity to the polyurethane base resin.

The second type (Type 2) of hydroxyl-terminated, linear, saturated copolyesters used in producing the polyurethane base resin of the invention is liquid copolyesters having glass transition temperatures between about $-10°$ C. and about $-60°$ C. and having from about 40% to about 100% aliphatic character. These copolyesters impart increased open time, adhesion and elasticity and decreased flow point, cohesion and hardness to the polyurethane base resin.

The third type (Type 3) of hydroxyl-terminated, linear, saturated copolyesters used to produce the polyurethane base resin of the invention is solid, partially crystalline copolyesters having glass transition temperatures below 0° C. and having from about 40% to about 100% aliphatic character. These copolyesters impart increased cohesion and decreased melt viscosity and open time to the polyurethane base resin.

The term "linear saturated copolyesters" as used herein means that the copolyesters are prepared by polymerization of one or more dicarboxylic acids or the corresponding anhydrides thereof, including acids having an aromatic structure, such as phthalic acids, with diols such as ethylene glycol, propylene glycol, butylene glycol, hexylene glycol, diethylene glycol or neopentyl glycol. The term "linear saturated copolyesters" does not include unsaturated dicarboxylic acids such as maleic acid or fumaric acid.

The proportions, by relative equivalents (wherein the total equivalents of Types 1, 2, and 3 is 1.0), of the three copolyesters in the polyurethane base resin of the invention, are as follows: Type 1: from about 0 to about 1; Type 2: from about 0 to 1; and Type 3 from about 0 to 1. Preferably, the proportions are Type 1: from about 0 to 0.50; Type 2: from about 0 to about 0.50; and Type 3: from about 0.25 to about 0.75. Most preferably, the proportions are Type 1: about 0.25; Type 2: about 0.25; and Type 3: about 0.50.

Synthesis of both conventional polyurethane base resins, as well as the polyurethane base resin of the present invention are carried out in glass resin reaction equipment under a dry nitrogen blanket or under vacuum. The polyols are preheated to about 60° C. while mixing. The isocyanate is preheated to at least 50° C. in a closed container in an oven. Following combination of the reactants to form a prepolymer, and completion of any exotherm, with or without catalyst addition, the prepolymer is heated to about 80° C. until stabilization occurs. The term "stabilization" as used herein refers to the absence of further changes in appearance, such as color and clarity, viscosity and percent free isocyanate content over a period of from 15 to 30 minutes after the prepolymer reaches 80° C. During the reaction, the percent of free isocyanate gradually decreases until a final targeted range of about ±0.1% NCO is reached, where % NCO=42.02×100/equivalent weight of the prepolymer. The isocyanate content is determined by measuring by titration, such as by ASTM D2572 "Standard Test Method For Isocyanate Groups In Urethane Materials Or Prepolymers".

The ratio of isocyanate group equivalents to hydroxyl group equivalents for the synthesis of the polyurethane base resin is from about 1.05:1.00 equivalents NCO/OH to about 10:1 equivalents NCO/OH, preferably from about 1.2:1.0 equivalents NCO/OH to about 3:1 equivalents NCO/OH, most preferably about 2:1 equivalents NCO/OH.

An organometallic catalyst such as an organotin catalyst may also be present during the synthesis of the polyurethane base resin. The catalyst accelerates the synthesis and may improve the cure rate of the adhesive composition. Tertiary amine catalysts may provide similar effects. However, a particular organometallic or tertiary amine catalyst may be evaluated to determine whether it would impart an adverse effect on package stability of the base resin or on the final adhesive product properties.

Exemplary catalysts suitable for use in cure acceleration and/or synthesizing the polyurethane base resin include trialkylamines such as trimethylamine, triethylamine, dimethyldodecylamine, heterocyclic amines, such as N-alkyl morpholines (e.g., N-methylmorpholine, N-ethylmorpholine, B,B'-dimorpholinodiethylether), N,N-dimethylethanolamine, 1,8-diazabicyclo[5.4.0]undecene-7 (DBU) and its salts, 1,4-dimethylpiperazine, triethylenediamine, and aliphatic polyamines, such as N,N,N',N'-tetramethyl-1,3-butanediamine, N,N,N',N'',N'' pentamethyldiethylene triamine, N,N-dimethylcyclohexylamine, N-methyldicyclohexylamine, N,N,N'N'-tetramethylpropylene diamine and N,N,N',N'-tetramethylhexamethylene diamine; bis[2-(N,N-dialkylamino)alkyl]ether(s) for example, bis[2-(N,N-dimethylamino)ethyl]ether, bis[2-(N,N-dimethylamino)-1-methylethyl]ether, ether, and 2-(N,N-dimethylamino)ethyl-2-(N,N-dimethylamino)-1-methylethylether.

The organotin compound may be a stannous or stannic compound, such as a stannous salt of a carboxylic acid, a trialkyltin oxide, dialkyltin oxide, a dialkyltin dihalide, or dialkyltin oxide. The organic groups of the organic portion of the compound are usually hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin oxide, stannous octoate, stannous oleate, or a mixture thereof may be used.

Organometallic and metallic salt catalysts used in polyurethane chemistry typically contain metals or metallic ions from Groups VIII I-B, II-B and IV-A of the Periodic Table, e.g., tin, lead, iron, and mercury. Organometallic compounds of bismuth, titanium, antimony, uranium, cadmium, cobalt, thorium, aluminum, zinc, nickel, molybdenum, vanadium, copper, manganese, and zirconium are suitable for use in the invention. Mercury salts such as mercuric acetate are known to have catalytic activity toward the NCO/OH reaction. These salts tend to be less effective in catalytic quantities, however, and molar quantities may be required. Compounds of the formula RHgX, wherein R is aliphatic, aromatic, or cycloaliphatic and X is OCOR' (R' being defined in the same manner, but not necessarily the same radical as R) are highly effective in catalytic quantities. In addition to the aforementioned "catalyst" other chemicals that function as catalysts for providing special properties are suitable for use in the invention.

The catalyst is added in an amount of from about 0% to about 3% by weight of the resin, preferably from about 0.001% to about 1.500%, most preferably about 0.01%.

After completion of the synthesis reaction, the polyurethane base resin is degassed by vacuum, preferably greater than 29 in. Hg. The base resin can then be packaged in air tight containers blanketed with nitrogen for use in the processes of the invention or can be processed with modifying additives such as stabilizers, fillers, pigments, thixotropes, plasticizers, adhesion promoters, catalysts, reinforcements, antioxidants, flame retardants, crosslinking agents or solvents.

The water-generating curing composition used in the processes of the present invention functions as an in situ heat activated moisture curative for the polyurethane base resin. The water-generating curing compositions suitable for use in the invention are inorganic compositions and/or organic compositions that either release water of crystallization or form water upon decomposition during heating. The in situ released water reacts with the isocyanate functional polyurethane base resin, whereupon internal moisture curing occurs producing a foamable thermoset adhesive composition. Foaming is caused by carbon dioxide formation from the isocyanate and water reaction.

Organic or inorganic compounds that release or form water at elevated temperatures are suitable for use in the processes of the invention. Preferably, $CaSO_4.2H_2O$, $CaSO_4.\frac{1}{2}H_2O$, $NaHCO_3$, $(NH_4)_2CO_3$, $(NH_4)_2C_2O_4$ or ammonium stearate are employed as the water-generating curing composition in the processes of the invention.

The powdered water-generating curing composition can be dispersed in the polyurethane base resin at a temperature of from about 25° C. to about 200° C., preferably at from about 70° C. to about 100° C. to form a stable dispersion of a nonactivated adhesive composite. The nonactivated adhesive composite is then activated by heating to a temperature of from about 50° C. to about 250° C., preferably at from about 120° C. to about 220° C., which temperature is within the range of water formation or water release from the water-generating curing composition. The in situ released water reacts with the isocyanate-functional polyurethane base resin whereby the adhesive composite is moisture cured to form a foaming thermosetting polyurethane structural adhesive composition. The reaction between the generated water and the isocyanate produces $CO_2$ which causes foaming.

An additional embodiment of the present invention relates to a process for improving the particle surface inhibition and stability of the water-generating curing composition comprising treating the curing composition by drying, or by treating with at least one mono-isocyanate compound, or by encapsulating the curing composition in an inert material prior to dispersing the same in the polyurethane base resin. Applicants have found that such treatments result in greatly improved stability of the adhesive composition both at room temperature and at elevated temperatures.

Exemplary suitable mono-isocyanate compounds for treating the water-generating curing composition of the invention include p-toluene sulfonyl isocyanate; methyl isocyanate; ethyl isocyanate; isopropyl isocyanate; n-butyl isocyanate; t-butyl isocyanate; cyclohexyl isocyanate; n-octadecyl isocyanate; isocyanatoethylmethacrylate; and isocyanatopropyltriethoxysilane.

The mono-isocyanate compounds are used in amounts of from about 0 to about 10 weight percent, preferably from about 0.5 to about 5 weight percent, most preferably about 2 weight percent of the water-generating curing composition.

Applicants have found that encapsulation of the water-generating curing composition in an inert material provides improved stability, i.e., shelf life, molten pot-life and minimization of pressure build-up in closed containers, and improved green strength and reduced open time of the non-activated foaming thermoplastic polyurethane structural adhesive composition. Encapsulation isolates the water-generating curing composition from the isocyanate moieties of the polyurethane base resin and thus prevents or minimizes preactivation of the final adhesive product.

Thermoplastic resins are particularly suitable for use as encapsulants if they exhibit sharp softening points, low viscosity when molten, ease in milling, insolubility in the polyurethane base resin and inertness toward isocyanate. The encapsulant material has a melting point higher than the melting point of the polyurethane base resin but lower than the point of water formation or release from the water-generating curing composition and the melting point of the amine-terminated solid polyamide resin.

The proportion of the water-generating curing composition to the encapsulant material is from about 0 to about 100 weight percent curing composition, based on the total weight of the encapsulated resin, preferably from about 25 to about 75 weight percent curing composition, most preferably about 50 weight percent curing composition.

Exemplary suitable thermoplastic resins for use as encapsulants for the water-generating curing composition in the processes of the invention include hydrocarbon plastics and elastomers such as polyethylenes, polypropylenes, polymers of α-olefins such as 1-butene or 4-methylpentene-1, ionomers, chlorosulfonated polyethylenes, ethylene-propylene-diene terpolymers, natural rubber and other polyisoprenes, styrene-butadiene copolymers, acrylonitrile-butadiene copolymers, polybutadienes, polyisobutylenes, polychloroprenes, block copolymers of styrene-butadiene-styrene, styrene-isoprene-styrene and styrene-ethylene-butylene-styrene; carbon-chain polymers such as polystyrene, acrylonitrile-butadiene-styrene copolymers, polyacrylates, polymethacrylates, ethylene-acrylic acid copolymers, polyacrylonitriles, polyvinyl acetates, ethylene-vinylacetate copolymers, polyvinyl acetals, polyvinylbutyrals, polyvinyl chlorides, polyvinylidene chlorides, polytetrafluoroethylenes, polyhexafluoropropylenes, polychlorotrifluoroethylenes, polyvinylfluorides and polyvinylidene fluorides; heterochain thermoplastics such as polyamides, polyethyleneterephthalates, polyoxymethylenes, polycarbonates, polysulfides, polyphenylenesulfides, polysulfones, polyethersulfones, cellulosics, epoxies, polyesters, phenolics and polyurethanes; and high temperature polymers (including inorganic polymers) such as polyimides, polyphenyleneoxides, polyacetylenes and polydichlorophosphazenes. A particular thermoplastic resin may prove to be effective if its melting point (or melting point range) is less than the curing composition's activation temperature (or range), and is greater than that of the polyurethane base resin. Copolymers and combinations of all of the above thermoplastic resins are also suitable for use in the processes of the invention.

The water-generating curing composition is dispersed into the molten encapsulant to form a nonactivated curative encapsulant composite. A vacuum, preferably at least 29 in. Hg. is applied to degas the composite and remove any moisture. The composite is cooled and milled into a powder which is then dispersed in the polyurethane base resin at a temperature of from about 25° C. to about 200° C., preferably from about 70° C. to about 100° C. to form a stable nonactivated adhesive composite.

The adhesive composite is activated by heating to a temperature sufficient to cause water release by the water-generating curing composition. The temperature at which water release occurs for the water-generating curing composition can be determined by thermogravimetric analysis. At such temperatures, the released in situ water reacts with the isocyanate functional polyurethane base resin to produce an in situ moisture cured foamable thermosetting polyurethane structural adhesive composition.

Although foamable adhesives are desired in various applications, a decrease in cohesive strength often occurs due to the decreased density of the foamed product (i.e. there is less polymer and more air or other gases in the activated adhesive bondline). Applicants have discovered that a significant increase in the strength of foaming adhesive compositions is provided by combining two different curing mechanism technologies, i.e. by employing a particular level of an amine-terminated solid polyamide resin in place of a portion of the water-generating curing composition. The amount of foaming can be reduced and therefore an increase in cohesive strength results. The level of substitution can be varied to achieve the desired combination of strength and foaming.

Accordingly, another embodiment of the invention relates to a process for producing a foaming thermosetting polyurethane structural adhesive composition in which the degree of foaming can be adjusted to a desirable level comprising dispersing an amine-terminated solid polyamide resin and a water generating curing composition into a polyurethane base resin at a temperature of from about 25° C. to about 200° C. to form a nonactivated adhesive composite, and heating the same at a temperature preferably of from about 120° C. to about 220° C. to cure the composite and form an adhesive composition.

The amine-terminated polyamide resin can be formed into a powder and dispersed into a polyurethane base resin. The polyamide resin is prepared by reacting an excess of a polyamine compound with a polycarboxylic acid. Preferably, a diamine compound is employed. The diamine compound may be one or more of an aliphatic, cycloaliphatic or aromatic diamine compound having from about 2 to 40 carbon atoms. Alkylene diamine compounds are most preferred. Exemplary suitable diamine compounds include ethylene diamine, 1,2-diaminopropane, 1,3-diaminopropane, 1,4-diaminobutane, p-xylene diamine, 1,6-hexamethylene diamine, 2,-methylpentamethylene diamine, 4,4'-methylenebis(cyclohexylamine), 2,2-di-(4-cyclohexylamine)propane, polyglycol diamines, isophorone diamine, m-xylene diamine, cyclohexanebis(methylamine), bis-1,4-(2'-aminoethyl)benzene, 9-aminomethylstearylamine, 10-aminoethylstearylamine; 1,3-di-4-piperidyl propane, 1,10-diaminodecane, 1,12-diaminododecane, 1,18-diaminooctadecane, piperazine, N-aminoethylpiperazine, bis-(3-aminopropyl)piperazine, polyethylene polyamines such as diethylene triamine and triethylene tetramine, diethyltoluene diamine, methylene dianiline and bis(aminoethyl)diphenyl oxide. Dimeric fat diamines and "ether diamines" may also be used. These diamines are described in U.S. Pat. No. 4,018,733, and U.S. Pat. No. 3,010,782, the disclosures of which are incorporated herein by reference.

Monoamines are also suitable for use in the synthesis of the polyamide curative. Exemplary suitable amines include methylamine, dimethylamine, ethylamine, diethylamine, n-propylamine, di-n-propylamine, isopropylamine, n-butylamine, isobutylamine, sec-butylamine, tert-butylamine, di-n-butylamine, monoamylamine, diamylamine, ethylbutylamine, n-hexylamine, di-n-hexylamine, cyclohexylamine, benzylamine, α-phenylethylamine, β-phenylethylamine, aniline, methylaniline, diphenylamine, o-toluidine, m-toluidine, p-toluidine, o-anisdine, m-anisidine, p-anisidine, dodecylamine, cocoamine, hexadecylamine, octadecylamine, oleylamine, dicocoamine, and di(hydrogenated-tallow-)amine; amides such as cocoamide, octadecanamide, oleamide, o-toluene sulfonamide and p-toluene sulfonamide; and polyetheramines such as polyoxyethylene amine(s) and polyoxypropylene amines(s).

Polycarboxylic acids having a functionality of two are preferred for making an amine-terminated solid polyamide resin for use in the process of the invention. Dimerized fatty acids are suitable, however, straight chain lower molecular weight diacids such as sebacic acid, azelaic acid and dodecanedioic acid are preferred in preparing the polyamide resin. The term "dimerized fatty acid" is intended to include any acid obtained by dimerizing saturated, ethylenically unsaturated or acetylenically unsaturated naturally occurring or synthetic monobasic aliphatic carboxylic acids containing from 8 to 24 carbon atoms. Such dimerized fatty acids consist essentially of a mixture of about 36 carbon atom dicarboxylic acids and usually also contain several isomeric dimers together with a small amount of trimer and higher polymers, and are fully described in U.S. Pat. No. 4,018,733, the disclosure of which is incorporated herein by reference. Other suitable dicarboxylic acids include those that contain from 2 to 20 carbon atoms, such as oxalic, glutaric, malonic, adipic, succinic, suberic, sebacic, azelaic, dodecanedioic, pimelic, terephthalic, isophthalic, phthalic, napthalene dicarboxylic acids and 1,4- or 1,3-cyclohexane dicarboxylic acids.

In general, any dicarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used to form the polyamides. Also, any polycarboxylic acid in which the average functionality (number of functional groups per molecule) is greater than two, may be used. Corresponding acid anhydrides, esters, and acid chlorides of the foregoing acids are also suitable for use in the present invention and are encompassed by the term "dicarboxylic acid."

Monocarboxylic acids are also suitable for use in the invention. Exemplary suitable monocarboxylic acids include fatty acids. The term "fatty acids" as used herein is intended to included saturated, ethylenically unsaturated and acetylenically unsaturated naturally occurring and synthetic monobasic aliphatic acids containing from 8 to 24 carbon atoms. Suitable saturated fatty acids include branched and straight chain acids such as caprylic acid, pelargonic acid, capric acid, lauric acid, myristic acid, palmitic acid, isopalmitic acid, stearic acid, isostearic acid, arachidic acid, behenic acid and lignoceric acid. Suitable ethylenically unsaturated acids include the branched or straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodimic acid, eicosatetraenoic acid, nisinic acid, scoliodonic acid and chaulmoogric acid. Any acetylenically unsaturated fatty acid, both straight and branched chain, both mono-unsaturated and poly-unsaturated, are useful herein. Suitable examples of such materials include 10-undecynoic acid, tariric acid, stearolic acid, behenolic acid and isamic acid. Also, monocarboxylic acids having from two to seven carbon atoms may be used, such as acetic acid, propionic acid, butyric acid, valeric acid and caproic acid.

Any conventional process for preparing a polyamide resin may be employed. Synthesis is usually performed in glass resin reaction equipment under a dry nitrogen blanket or under vacuum to prevent oxidative degradation. The reactants are blended and heated gradually to from about 220° C. to about 240° C. During the temperature elevation, a condenser and collection vessel may be attached to collect the condensed water and any volatilized amine.

A phosphoric acid catalyst may also be employed to accelerate and improve the efficiency of the reaction. Exemplary suitable catalysts include acid compounds such as phosphoric acid, oxides or carbonates of alkaline nature such as magnesium oxide or calcium oxide and halogen salts of polyvalent metals and acids. The catalyst is present in an amount of from about 0% to about 3% by weight of the resin, preferably in an amount of from about 0.005% to about 0.500% by weight, most preferably in an amount of about 0.01% by weight.

The ratio of equivalents of amine to acid groups i.e., $NH_x/COOH$ (where x is 1 or 2) groups for the aminopolyamide synthesis is from about 1.05:1.00 equivalents $NH_x/COOH$ to about 10.00:1.00 equivalents $NH_x/COOH$, preferably from about 1.2:1.0 equivalents $NH_x/COOH$ to about 5.0:1.0 equivalents $NH_x/COOH$, most preferably about 1.35:1.00 equivalents $NH_x/COOH$.

When the appearance, viscosity, acid value and amine value have stabilized, a vacuum, preferably greater than 29 in. Hg, is applied to degas the polymer and remove trace amounts of water. The cooled solid product is then milled to a fine powder.

The amine-terminated polyamide resin may also be dried, or treated with one or more mono isocyanates or encapsulated in an inert material prior to being dispersed in the polyurethane base resin.

The process of the present invention for producing a foamable adhesive composition produces carbon dioxide formation during the curing reaction and requires no specialized foaming equipment, high pressure gas, blowing agent or catalyst, which is required by many prior art processes for producing foamable adhesives, sealants or conventional urethane foams. When the process of the invention is carried out using $NaHCO_3$, for example, as the water-generating curing composition, $CO_2$ is produced from thermal decomposition and from the subsequent reaction between the generated water and isocyanate groups.

The degree of foaming and the structure of the foam may be enhanced by incorporating a foam-promoting agent in the present process. Exemplary suitable foam promoting agents for use in the process of the invention include polyalkyleneoxide-methylsiloxane copolymers, tertiary amine catalysts, and auxiliary blowing agents such as methylene chloride or monofluorotrichloromethane. One particular material, L-5340, produced by Union Carbide Co. is most preferred for use in the process of the invention since it provides a good degree of foaming enhancement while having no adverse effect on stability. Volume expansions of greater 400% have been observed at levels of 1% by weight L-5340 based on the total weight of the adhesive product.

The foam promoting agent is preferably employed in an amount of from about 0 to about 5% by weight, more preferably from about 0.1 to about 2.0% by weight, most preferably about 1.0% by weight, based on the total weight of the adhesive product.

Foam reducing agents may also be employed in the process of the invention in applications wherein a lesser degree of foaming is desired. Exemplary suitable foam reducing agents include calcium oxide, soda lime, i.e., sodium hydroxide and calcium hydroxide; Ascarite, i.e., sodium hydroxide coated silica; activated carbon; molecular sieves; and antifoaming agents such as dimethylpolysiloxanes.

A foam-reducing agent is preferably employed in an amount of from about 0 to about 5% by weight, more preferably, from about 0.1 to about 2.0% by weight, most preferably about 1.0% by weight, based on the total weight of the adhesive product.

The equivalents of isocyanate groups to active hydrogen groups, i.e., NCO/yH groups (where y is NH, N, O, HO, S or COO) in the adhesive composition is from about 0.5:1.0 to about 2.0:1.0 equivalents NCO/yH, most preferably from about 0.8:1.0 to about 1.2:1.0 equivalents NCO/yH, most preferably about 1.1:1.0 equivalents NCO/yH.

Further, additives may be employed to impart additional desired properties to the adhesive compositions produced by the processes of the invention. Exemplary suitable additives include fillers, reinforcements, thixotropes, pigments, plasticizers, antioxidants, catalysts, stabilizers, adhesion promoters, flame retardants, cross-linking agents and solvents.

The invention will be further clarified by the following examples, which are intended to be purely exemplary of the invention.

All reaction or blending processes described in the following examples involve the use of a constant nitrogen purge unless otherwise noted.

EXAMPLE 1

Preparation of Polyester-Urethane Base Resin

Into a one liter resin reaction flask, 298.9 g of Dynacoll RP-360 (Hüls America), 144.6 g of Dynacoll RP-230 and 74.8 g of Dynacoll RP-110 were charged under a nitrogen blanket. The three copolyester diols were heated to 91° C. and mixed until homogenous and then allowed to cool to 73° C. 81.7 g of MDI (4,4'-diphenylmethane diisocyanate) were charged while mixing. As the reaction proceeded, an exotherm to 81° C. was observed. The resulting prepolymer was then degassed by applying a vacuum of 29.8 in. Hg. The product was then analyzed for isocyanate content. 2.05% NCO was obtained. The product was then discharged into half-pint containers and sealed under nitrogen.

A 30 g sample of the molten resin was poured into an aluminum weighing dish and allowed to cool and solidify and then demolded. Following exposure to atmospheric moisture, periodic hardness measurements were taken.

| Days of R.T. Exposure | Shore D Hardness |
|---|---|
| 1 | 33 |
| 3 | 42 |
| 7 | 51 |
| 14 | 51 |

A sealed container of the prepolymer was stored at 70° C. for 19 days. With the exception of a moderate surface skin, the material remained stable (i.e. clear and fluid).

The Brookfield Thermosel viscosity was measured at 70° C. and was found to be 59,700 cP.

The open time was measured and was found to be 2 minutes. Open time is the period during which wet delamination occurs when pulling off a 1"×4" strip of Kraft paper at a 90° angle from a cooling 20 mil wet molten film of adhesive on cardboard. The film is prepared by heating an adhesive and a drawdown bar to 120° C. and then testing at 15 second intervals. The open time is the 15 second interval immediately before dry delamination or fiber tear occurs.

The base resin obtained demonstrated good adhesion to plastics and metals (without further modification) when treated as an ambient moisture-cured polyurethane. Shear strengths were found to be as high as 1550 lbs./in.$^2$.

EXAMPLE 2

Preparation of Inert Thermoplastic Encapsulant

Using the same reaction equipment as in Example 1, 368.7 g of Empol 1010 (dimerized fatty acids from Quantum Chemicals, Emery Division) and 8.0 g of a 1% (by weight) solution of $H_3PO_4$ (85%, aq) in Empol 1010 were charged and mixed until homogeneous. 15.0 q of Sebacic Acid, Cp Grade (Union Camp) and 408.2 g of Armeen 18D (octadecylamine from Akzo Chemie America, Armak Chemicals Division), were charged, mixed and heated gradually to 241° C. The temperature was maintained above 230° C. for approximately two hours, the final hour of which a vacuum of 29.6 in. Hg was applied to degas the polyamide resin and remove trace amounts of water. The molten resin was discharged into a release paper lined box and cooled under nitrogen in a desiccator and stored for future use as an encapsulant for curing agents.

Test Results:
Acid Value (mg KOH/g)=1.7
Amine Value (mg KOH/g)=1.7
Shore D Hardness=41
Ring and Ball Softening Point (°C.)=100° C.
Brookfield Thermosel Viscosity (cP)=525 at 100° C.

EXAMPLE 3

Encapsulation of $CaSO_4.\frac{1}{2}H_2O$

Using the same reaction/blending apparatus as in Example 2, 250.0 g of the inert polyamide encapsulant from Example 2 were charged after breaking the solid resin into medium sized chips. Heat was applied and at the onset of melting, mixing was commenced. Once completely molten and T=122° C., 250.0 g of $CaSO_4.\frac{1}{2}H_2O$ were charged while mixing. When homogeneous, a vacuum of 29.0 in. Hg at T=110° C. was applied to degas the product. The product was discharged into a release paper lined box and cooled under a nitrogen blanket in a desiccator. Once completely cooled, the solid product was broken into medium sized chips and milled to a powder (with the aid of liquid nitrogen chilling) using a Brinkmann Centrifugal Mill. The curative was then passed through a 250μ screen to remove the coarse particles. The powdered, encapsulated curative was stored in a sealable container under nitrogen for future incorporation with a polyurethane base resin.

Test Results
Shore D hardness = 48
Ring and Ball Softening Point (° C.) = 103
Brookfield Thermosel Viscosity (cP) = 960 at 110° C.

EXAMPLE 4

Encapsulation of $NaHCO_3$

In the same manner as in Example 3, $NaHCO_3$ was encapsulated and milled and stored for future incorporation with a polyurethane base resin.

Test results
Shore D Hardness = 40
Ring and Ball Softening Point (° C.) = 103
Brookfield Thermosel Viscosity (cP) = 998 at 110° C.

EXAMPLE 5

Preparation of Polyester-urethane/Encapsulated $CaSO_4 \cdot \frac{1}{2}H_2O$ Composite Adhesive System A polyester-urethane base resin was synthesized in a manner similar to that in Example 1 by reacting a blend of 345.8 g of RP-360, 167.4 g of RP-230 and 86.5 g of RP-110 with 94.6 g of MDI to a % NCO of 1.8. 8.0 g of L-5340 (polyoxyalkylene-siloxane surfactant from Union Carbide) were added, mixed and degassed under a vacuum of 29.3 in. Hg. With the molten degassed prepolymer at a temperature of 76° C., 97.8 g of the milled encapsulated $CaSO_4 \cdot \frac{1}{2}H_2O$ curative of Example 3 were gradually charged while mixing. When the addition was completed a temperature of 78° C. was observed. The homogeneous dispersion was degassed under a vacuum of 29.5 in. Hg and discharged into half-pint containers under nitrogen.

| Test Results: | |
|---|---|
| Brookfield Thermosel Viscosity (cP) = | 193,000 at 70° C. |
| | 63,250 at 100° C. |
| | 52,250 at 130° C. |
| | 18,500 at 160° C. |
| | 14,850 at 180° C. |
| Noticeable foaming taking place at ≥ 160° C. during the viscosity measurements. | |
| Cure/Foam Test - 10 g, 10 min. at 160° C. | |
| Volume Expansion - 400% | |

EXAMPLE 6

Preparation of Polyester-urethane/Encapsulated $NaHCO_3$ Composite Adhesive System In the same manner as in Example 5, a polyester-urethane based adhesive product was prepared with L-5340 except that the encapsulated $NaHCO_3$ from Example 4 was incorporated. The following quantities were employed: 379.1 g of RP-360, 183.4 g of RP-230, 94.8 g of RP-110, 103.7 g of MDI, 8.0 g of L-5340 and 31.0 g of the encapsulated $NaHCO_3$ from Example 4.

| Test Results: | |
|---|---|
| Brookfield Thermosel Viscosity (cP) = | 109,000 at 70° C. |
| | 75,750 at 100° C. |
| | 31,000 at 130° C. |
| | 5,538 at 160° C. |
| | 7,775 after 3 min. at 160° C. |
| Noticeable foaming taking place at ≥ 150° C. during the viscosity measurements. | |
| Cure/Foam Test - 10 g. 10 min. at 160° C. | |
| Volume Expansion - 400% | |

EXAMPLES 7 and 8

Preparation of Comparative Polyester-urethane $CaSO_4 \cdot \frac{1}{2}H_2O$ and Polyester-urethane/$NaHCO_3$ Composite Adhesive Systems In the same manner as in examples 5 and 6, two different polyester-urethane based adhesive products were prepared except that the $CaSO_4 \cdot \frac{1}{2}H_2O$ (Example 7) and $NaHCO_3$ (Example 8) curatives were incorporated respectively, without encapsulation.

| | Test Results: Sealed Container Stability at 70° C. | | | |
|---|---|---|---|---|
| Example Type | 7 | 5 | 8 | 6 |
| 3 hours | Very viscous, very gassy, pressure build-up | Slightly viscous, slightly gassy, no pressure | Viscous, discolored | Very fluid not discolored |
| 8 hours | — | Viscous, gassy, no pressure | — | Very fluid not discolored |

Note: Observations were made at 70° C.

Encapsulation of the curatives resulted in greatly improved molten potlife.

EXAMPLE 9

Preparation of Polyester-urethane with Inert Thermoplastic Encapsultant Present

In the same manner as in Examples 5 and 6 a polyester-urethane based adhesive was prepared except that instead of incorporating a curing agent, a portion of milled (≦250μ) inert thermoplastic encapsultant from Example 2 was incorporated with the urethane base resin. The following quantities were employed: 266.4 g of RP-360, 128.9 g of RP-230, 66.6 g of RP-110, 72.8 g of MDI and 65.3 g of powdered encapsultant resin from Example 2.

| Test Results: | Example 1 | Example 9 |
|---|---|---|
| Shear Adhesion to Cold Rolled Steel | | |
| 30 sec. at 180° C. + 2 hrs. at R.T. | 231 lbs./in.$^2$ | 245 lbs./in.$^2$ |
| 30 sec. at 220° C. + 2 hrs. at R.T. | 149 lbs./in.$^2$ | 246 lbs./in.$^2$ |
| Open Time | | |
| 120° C., 20 mil | 2 min. | 1.5 min. |

The presence of the encapsulant alone provides up to a 65% increase in initial shear strength and a 25% reduction in open time.

EXAMPLE 10

Preparation of Amino-polyamide Curative

Using the same reaction apparatus as in Example 1, 504.6 g of Dytek A (2-methylpentamethylenediamine from DuPont) were charged. While mixing, 295.4 g of Sebacic Acid, CP Grade (Union Camp) were added. These reactants were mixed and gradually heated to 245° C. The reaction temperature was maintained above 230° C. for approximately 10 hours, the final hour of which a vacuum of 30 in. Hg was applied to degas the polyamide resin and remove trace amounts of water. The molten resin was discharged into a release paper lined box and cooled under nitrogen in a desiccator.

Once completely cooled and solidified, the resin was broken into medium sized chips and milled to a powder (with the aid of liquid nitrogen chilling) using a Brinkmann Centrifugal Mill. The milled polyamide was then passed through a 250μ screen then packaged under nitrogen for future use or further modification.

EXAMPLE 11

Treatment for Stabilization of Milled Amino-polyamide Curative

A 180.0 g portion of a solution of 1% (by weight) p-toluenesulfonyl isocyanate in dry toluene was charged to the same reaction apparatus as in Example 10. While mixing, 180.0 g of powdered (≦250μ) amino-polyamide from Example 10 was charged to the reactor. The contents were blended thoroughly until a homogeneous suspension resulted. Mild heating was applied until the suspension reached ≧45° C. The mixture was agitated with continued mild heating until the majority of toluene was driven off. A vacuum of >29 in. Hg was applied to the relatively dry powdery mass to remove any remaining solvent. The treated amino-polyamide powder was then discharged into a sealable container under nitrogen and stored for future incorporation with a polyurethane base resin.

Test Results:

Amine Value (mg KOH/g) = 105.5
Ring and Ball Softening Point (°C) = 121
Brookfield Thermosel Viscosity (cP) = 70 at 200° C.
200 at 160° C.

EXAMPLE 12

Preparation of Composition Containing Encapsulated NaHCO$_3$ and Amino-polyamide Heat Activated Curative

| Curative Composition: | | | | |
|---|---|---|---|---|
| % Encapsulated NaHCO$_3$ | 100 | 50 | 25 | 0 |
| % Treated amino-polyamide | 0 | 50 | 75 | 100 |
| Shear Strength (lbs./in.$^2$): | | | | |
| Cold Rolled Steel, 30 Sec at 180° C. + 2 hrs. at R.T. | 210 | 269 | 288 | 394 |
| Relative % Volume Exapansion: | | | | |
| 10 g, 20 min. at 160° C. in a 2 oz. glass bottle | >433 | 367 | 200 | 0 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for preparing a thermosetting polyurethane composite comprising dispersing a water-generating curing composition into a polyurethane base resin.

2. The process of claim 1 wherein said dispersing step is carried out at a temperature of from about 25° C. to about 200° C.

3. The process of claim 1 wherein said base resin is a liquid.

4. The process of claim 1 wherein the water-generating curing composition generates water by water formation or release at an elevated temperature.

5. The process of claim 4 wherein the polyurethane base resin has a melting point at least 5 degrees lower than the point of water formation or release from the water-generating curing composition.

6. The process of claim 5 wherein the polyurethane base resin has a melting point at least 40 degrees lower than the point of water formation or release from the water-generating curing composition.

7. The process of claim 1 wherein said polyurethane base resin is prepared by reacting excess 4,4'-diphenylmethane diisocyanate and at least one saturated copolyester diol compound.

8. The process of claim 1 wherein the water generating curing composition is at least one compound selected from the group consisting of CaSO$_4$.2H$_2$O, CaSO$_4$.½H$_2$O, NaHCO$_3$, (NH$_4$)$_2$CO$_3$, (NH$_4$)$_2$C$_2$O$_4$ and ammonium stearate.

9. The process of claim 1 further comprising drying the water-generating curing composition prior to dispersing the curing composition into the polyurethane base resin.

10. The process of claim 1 further comprising treating the water-generating curing composition with at least one mono-isocyanate compound prior to dispersing the curing composition into the polyurethane base resin.

11. The process of claim 1 further comprising dispersing the water-generating curing composition into an inert encapsultant composition prior to dispersing the curing composition into the polyurethane base resin.

12. The process of claim 1 wherein the inert encapsultant composition is a thermoplastic resin.

13. The process of claim 12 wherein the water-generating curing composition generates water by water formation or release at an elevated temperature.

14. The process of claim 13 wherein the inert encapsultant composition has a melting point higher than the melting point of the polyurethane base resin and lower than the point of water formation or release from the water-generating curing composition.

15. The process of claim 1 wherein the polyurethane base resin is prepared by reacting an excess amount of a polyisocyanate compound with at least one copolyester selected from (a) a hydroxyl-terminated, linear, solid, amorphous saturated copolyester having a glass transition temperature greater than 0° C. and having from about 80% to about 100% aromatic character; (b) a hydroxyl-terminated, linear, saturated, liquid copolyester having a glass transition temperature between about −10° C. and about −60° C. and having from about 40% to about 100% aliphatic character; and (c) a hydroxyl-terminated, linear, solid, partially crystalline, saturated copolyester having a glass transition temperature below 0° C. and having from about 40% to about 100% aliphatic character, wherein said copolyesters each have a molecular weight between about 1000 g/mol and 6000 g/mol and wherein the amounts of said copolyesters are from about 0 to about 1 equivalent of the solid amorphous saturated copolyester, from about 0 to about 1 equivalent of the saturated liquid copolyester, and from about 0 to about 1 equivalent of the partially crystalline saturated copolyester, and wherein the sum of the equivalent amounts of said copolyesters is 1.

16. The process of claim 15 wherein the polyisocyanate compound is 4,4'-diphenylmethane diisocyanate.

17. The process of claim 1 further comprising dispersing a foam promoting agent into said polyurethane base resin.

18. The process of claim 17 wherein said foam promoting agent is selected from the group consisting of polyalkyleneoxide-methylsiloxane copolymers, tertiary amine catalysts, methylene chloride and monofluorotrichloromethane.

19. The process of claim 1 further comprising dispersing a foam reducing agent into said polyurethane base resin.

20. The process of claim 19 wherein said foam reducing agent is selected from the group consisting of calcium oxide, soda lime, activated carbon, molecular sieves and di-methylpolysiloxanes.

21. The process of claim 1 wherein the ratio of equivalents of isocyanate groups to active hydrogen groups in said composite is from about 0.5:1.0 to about 2.0:1.0.

22. The process of claim 21 wherein the ratio of equivalents of isocyanate groups to active hydrogen groups in said composite is from about 0.8:1.0 to about 1.2:1.0.

23. A thermosetting polyurethane composite comprising a polyurethane base resin and a water-generating curing composition.

24. The thermosetting polyurethane composite of claim 23 wherein the polyurethane base resin is prepared by reacting excess 4,4'-diphenylmethane diisocyanate and at least one saturated copolyester diol compound.

25. The thermosetting polyurethane composite of claim 23 wherein the polyurethane base resin is prepared by reacting an excess amount of a polyisocyanate compound with at least one copolyester selected from (a) a hydroxyl-terminated, linear solid, amorphous saturated copolyester having a glass transition temperature greater than 0° C. and having from about 80% to about 100% aromatic character; (b) a hydroxyl-terminated, linear, saturated, liquid copolyester having a glass transition temperature between about −10° C. and about −60° C. and having from about 40% to about 100% aliphatic character; and (c) a hydroxyl-terminated, linear, solid, partially crystalline, saturated copolyester having a glass transition temperature below 0° C. and having from about 40% to about 100% aliphatic character, wherein said copolyesters each have a molecular weight between about 1000 g/mol and 6000 g/mol and wherein the amounts of said copolyesters are from about 0 to about 1 equivalent of the solid amorphous saturated copolyester, from about 0 to about 1 equivalent of the saturated liquid copolyester, and from about 0 to about 1 equivalent of the partially crystalline saturated copolyester, and wherein the sum of the equivalent amounts of said copolyesters is 1.

26. The thermosetting polyurethane composite of claim 25 wherein the polyisocyanate compound is 4,4'-diphenylmethane diisocyanate.

27. The thermosetting polyurethane composite of claim 23 wherein the water-generating curing composition generates water by water formation or release at an elevated temperature.

28. The thermosetting polyurethane composite of claim 27 wherein the polyurethane base resin has a melting point at least 5 degrees lower than the point of water formation or release from the water-generating curing composition.

29. The thermosetting polyurethane composite of claim 28 wherein the polyurethane base resin has a melting point at least 40 degrees lower than the point of water formation or release from the water-generating curing composition.

30. The thermosetting polyurethane composite of claim 23 wherein the polyurethane base resin is a liquid.

31. The thermosetting polyurethane composite of claim 23 wherein the water-generating curing composition is dispersed in the polyurethane base resin.

32. The thermosetting polyurethane composite of claim 31 wherein the dispersed water-generating curing composition is encapsulated with an inert encapsulant composition.

33. The thermosetting polyurethane composite of claim 32 wherein the encapsulant composition comprises a thermoplastic resin.

34. The thermosetting polyurethane composite of claim 33 wherein the encapsultant composition has a melting point higher than the melting point of the polyurethane base resin but lower than the point of water formation or release from the water-generating curing composition.

35. The thermosetting polyurethane composite of claim 34, wherein the encapsultant composition is present in an amount of from about 25 to about 75 percent by weight of the water-generating curing composition.

36. The thermosetting polyurethane composite of claim 23 wherein the water generating curing composition is at least one compound selected from the group consisting of $CaSO_4 \cdot 2H_2O$, $CaSO_4 \cdot \frac{1}{2}H_2O$, $NaHCO_3$, $(NH_4)_2CO_3$, $(NH_4)_2C_2O_4$ and ammonium stearate.

37. The thermosetting polyurethane composite of claim 23 wherein the composite further comprises an amine-terminated polyamide resin.

38. The thermosetting polyurethane composite of claim 23 wherein the composition is foamable.

39. The thermosetting polyurethane composite of claim 14 wherein the composite further comprises a foam promoting agent.

40. The thermosetting polyurethane composite of claim 39 wherein said foam promoting agent is selected from the group consisting of polyalkyleneoxide-methylsiloxane copolymers, tertiary amine catalysts, methylene chloride and monofluorotrichloromethane.

41. The thermosetting polyurethane composite of claim 23 wherein the composite further comprises a foam reducing agent.

42. The thermosetting polyurethane composite of claim 41 wherein said foam reducing agent is selected from the group consisting of calcium oxide, soda lime, activated carbon, molecular sieves and dimethylpolysiloxanes.

43. The thermosetting polyurethane composite of claim 23 wherein the ratio of equivalents of isocyanate groups to active hydrogen groups in said composite is from about 0.5:1.0 to about 2.0:1.0.

44. The thermosetting polyurethane composite of claim 43 wherein the ratio of equivalents of isocyanate groups to active hydrogen groups in said composite is from about 0.8:1.0 to about 1.2:1.0.

45. The thermosetting polyurethane composite of claim 23 wherein the water-generating curing composition releases water or forms water upon heating to from about 50° to about 250° C. and the composite comprises an adhesive composition.

46. The thermosetting polyurethane composite of claim 45 wherein the water-generating curing composition releases water or forms water upon heating to from about 120° to about 220° C.

47. A process for preparing a hot melt adhesive which cures with moisture comprising adding a substance which releases water or forms water upon heating so as to cure a base resin via terminal isocyanate groups.

48. The hot melt adhesive made by the process of claim 47.

* * * * *

UNITED STATES PATENT AND TRADEMARK OFFICE
CERTIFICATE OF CORRECTION

PATENT NO. : 5,075,407
DATED : December 24, 1991
INVENTOR(S) : Cody et al.

It is certified that error appears in the above-identified patent and that said Letters Patent is hereby corrected as shown below:

On the title page, Item [54] and Col. 1 lines 1-4 --POLYURETHANE STRUCTURAL ADHESIVE COMPOSITIONS AND PROCESSES FOR PRODUCING THE SAME--.

In column 18, line 30, amend "$CaSO_4.2H_2O$" to --$CaSO_4 \cdot 2H_2O$--.

In column 18, line 31, amend "$SO_4.\frac{1}{2}H_2O$" to --$SO_4 \cdot \frac{1}{2}H_2O$--.

In column 18, line 46, amend "1" to --11--.

In column 19, line 64, amend "toa bout" to --to about--.

In column 20, line 29, amend "encapsultant" to --encapsulant--.

In column 20, line 44, amend "$CaSO_4.2H_2O$" to --$CaSO_4 \cdot 2H_2O$--.

In column 20, line 44, amend "$CaSO_4.\frac{1}{2}H_2O$" to --$CaSO_4 \cdot \frac{1}{2}H_2O$--.

In column 20, line 52, amend "14" to --38--.

Signed and Sealed this

Twenty-ninth Day of June, 1993

Attest:

MICHAEL K. KIRK

*Attesting Officer*   *Acting Commissioner of Patents and Trademarks*